United States Patent
Schneider et al.

(10) Patent No.: US 7,490,347 B1
(45) Date of Patent: Feb. 10, 2009

(54) HIERARCHICAL SECURITY DOMAIN MODEL

(75) Inventors: Juergen Schneider, Ludwigshafer (DE); Hiltrud Jaeschke, Muenster (DE); Maria Jurova, Sofia (BG); Stephan H. Zlatarev, Stara Zagora (BG)

(73) Assignee: SAP AG, Walldorf (DE)

( * ) Notice: Subject to any disclaimer, the term of this patent is extended or adjusted under 35 U.S.C. 154(b) by 789 days.

(21) Appl. No.: 10/837,397

(22) Filed: Apr. 30, 2004

(51) Int. Cl.
H04L 29/00 (2006.01)
(52) U.S. Cl. .......................... 726/2; 713/157
(58) Field of Classification Search .................. 713/166
See application file for complete search history.

(56) References Cited

U.S. PATENT DOCUMENTS

| | | | | |
|---|---|---|---|---|
| 4,104,721 | A | * | 8/1978 | Markstein et al. ........... 711/164 |
| 7,010,600 | B1 | * | 3/2006 | Prasad et al. ................ 709/225 |
| 7,039,714 | B1 | * | 5/2006 | Blakley III et al. .......... 709/229 |
| 7,194,764 | B2 | * | 3/2007 | Martherus et al. .............. 726/8 |
| 7,225,256 | B2 | * | 5/2007 | Villavicencio .............. 709/225 |
| 2004/0044655 | A1 | * | 3/2004 | Cotner et al. .................. 707/3 |
| 2005/0240996 | A1 | * | 10/2005 | Hitchcock .................... 726/17 |
| 2006/0173999 | A1 | * | 8/2006 | Rider et al. ................. 709/225 |
| 2007/0110248 | A1 | * | 5/2007 | Li ............................... 380/278 |

OTHER PUBLICATIONS

Saltzer, Jerome, "Protection and the Control of Information Sharing Multics", Jul. 1974, Communications of the ACM, vol. 17, No. 7, pp. 388-402.*
Vazquez-Gomez, Jose, "Modeling Multidomain Security", 1993, ACM, pp. 167-174.*
Jiang et al, "An Authentication Model for Multilevel Security Domains", 2003, IEEE, pp. 1534-1539.*

* cited by examiner

*Primary Examiner*—Matthew B Smithers
(74) *Attorney, Agent, or Firm*—Blakely, Sokoloff, Taylor & Zafman, LLP (57) ABSTRACT

According to one aspect of the invention, a hierarchy of security domains and a method for granting a user access to the security domains are provided. The hierarchy of security domains includes multiple security levels and relationships between particular security domains. When a user is authenticated and/or authorized for access to a first security domain, the user is tagged as having been granted access to that security domain. If the user attempts to access a related security domain with a lower security level, the user is granted access without having to be re-authenticated and/or re-authorized. If the user attempts to access a related security domain with a higher security level, the user must be re-authenticated and/or re-authorized be access is granted to the security domain with the higher security level.

28 Claims, 11 Drawing Sheets

HIERARCHICAL SECURITY DOMAIN MODEL

BACKGROUND OF THE INVENTION

1). Field of the Invention

This invention relates to a security protocol for a computer system, and in particular, it relates to a structure of security domains and a method of authenticating a user for access to the computer system.

2). Discussion of Related Art

The task of protecting information stored on computers is becoming increasingly difficult and complex as more and more companies are storing an ever increasing amount of data electronically. The job of keeping such information secure is even further hampered by the fact that many of the computers and databases on which this information is stored are remotely accessible through various public networks, such as the internet.

Figure 1:
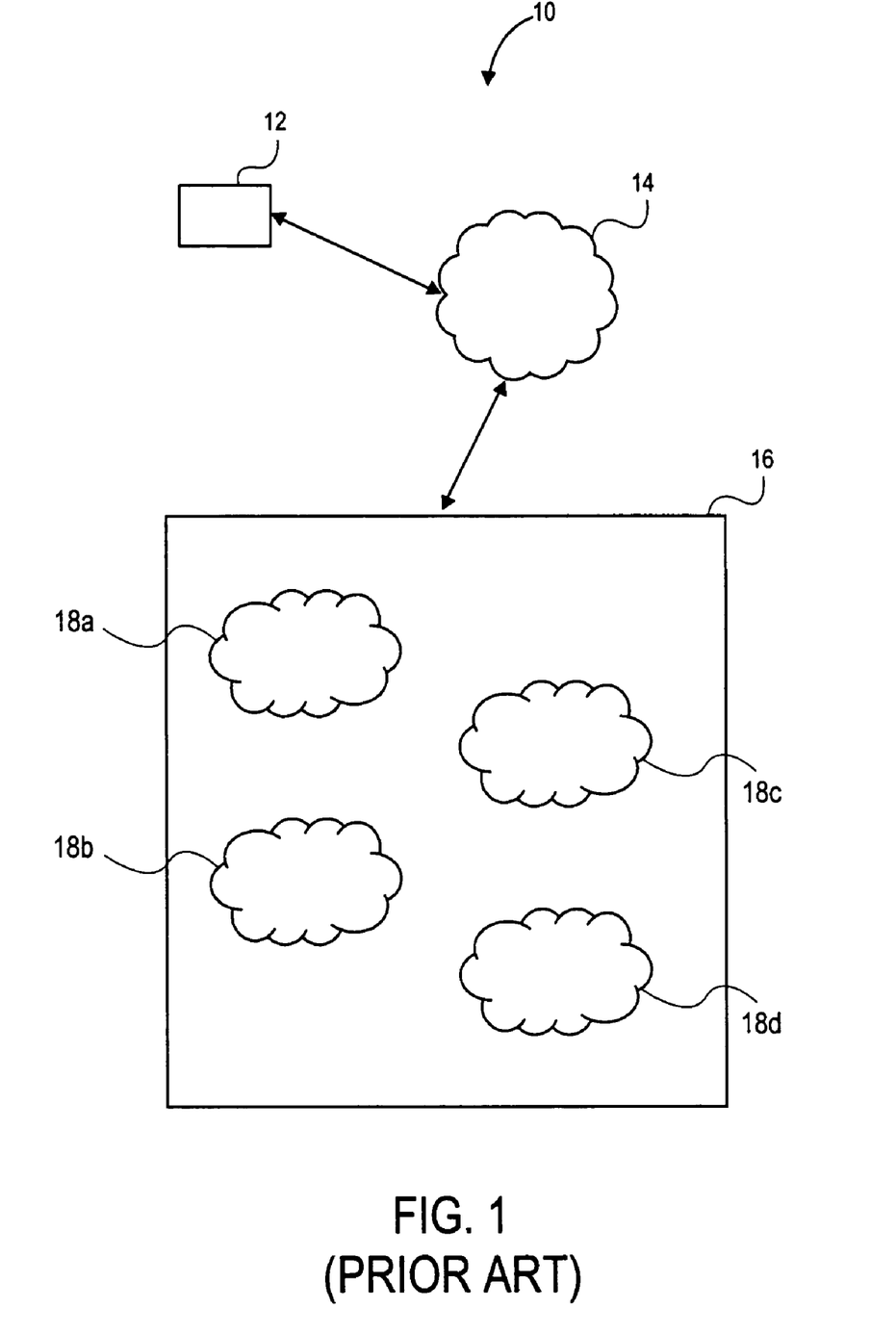
FIG. 1 is a block diagram of a typical network system.

FIG. 1 illustrates an example of a typical computer network system 10, including a client 12, a network 14, and a container 16. The client 12 is, for example, a computer, or an individual using a computer, attempting to access the container 16 through the network 14. The network 14 includes a series of points or nodes (e.g., switches, routers, etc.) interconnected by communication paths. The network may include one or more of the following: the internet, a public network, or a local area network (LAN), and a private network.

The container 16, which may be a implemented upon a server, contains resources of various kinds of information, such as applications 18a, 18b, 18c, and 18d. The information stored within the container 16 has different levels of "sensitivity" and therefore, different levels of security domains are required to prevent the more secure information from clients 12 who the system administrator has decided should not be able to view it.

For example, the system 10 illustrated in FIG. 1 could be a private network for a corporation having four levels of employees: regular employees, managers, senior managers, and information technology (IT) personnel. Likewise, the corporation could have four resources of information stored in the container as illustrated by the four applications 18a-18d within the container 16 in FIG. 1. Each of the resources contains information of varying sensitivity. For instance, one resource contains relatively low-level security information such as the business address and phone number and employee identification number for every employee. Other resources contain moderately secure, or mid-level security, information such as the home address and phone number, along with the social security number, of every employee and the network user identification and password for every employee. High-level security resources contain very sensitive information such as the salary and performance appraisal for every employee.

In all likelihood, only the senior managers would have access to all of the resources of information, except perhaps the network user ID and password for every employee. The managers would probably have access to some of the mid and all of the low security information, not the high security information. A regular employee would only have access to the low security information.

Whenever an employee attempts to access a particular resource of information, he or she must be authenticated and authorized. Authentication is the process of determining whether someone or something is actually who or what it is claiming to be. One common authentication tool uses a user identification and a password, other such tools may use digital certificates. Authorization is the process of giving someone or something permission to do or have something. Thus authentication determines who the employee is, and authorization determines what information the employee will be able to access.

When a manager accesses the mid-level security information, he is first authenticated and authorized. If the manager then attempts to access the high-level security information, he must again be authenticated to do so. Under the security protocol described above, the manager would not be granted access to the high-level security information.

However, a problem is that every time an employee attempts to access a security level that is lower than the one to which he has already been granted access, he must again be authenticated and authorized. Therefore, if the manager attempts to access the low-level security information, he will also have to be authenticated and authorized to do so, even through he has already been granted access to a higher security level.

SUMMARY OF THE INVENTION

The invention provides a hierarchy of security domains and a method for granting a user access to the security domains. The hierarchy of security domains includes multiple security levels and relationships between particular security domains. When a user is authenticated and/or authorized for access to a first security domain, the user is tagged as having been granted access to that security domain. If the user attempts to access a related security domain with a lower security level, the user is granted access without having to be re-authenticated and/or re-authorized. If the user attempts to access a related security domain with a higher security level, the user must be re-authenticated and/or re-authorized be access is granted to the security domain with the higher security level.

BRIEF DESCRIPTION OF THE DRAWINGS

The invention is described by way of example with reference to the accompanying drawings, wherein:

FIGS. 3A-5C are schematic views of a networked computing system infrastructure incorporating the hierarchy of security domains of FIG. 2;

DETAILED DESCRIPTION OF THE INVENTION

FIG. 2 through FIG. 6 illustrate a computing system, or a computer network system, which incorporates a hierarchy of security domains and a method for granting a user access to the security domains based on the hierarchy. The hierarchy of security domains includes multiple security levels and relationships between particular security domains. When a user is authenticated and/or authorized for access to a first security domain, the user is tagged as having been granted access to that security domain. If the user attempts to access a related security domain with a lower security level, the user is granted access without having to be re-authenticated and/or re-authorized. If the user attempts to access a related security domain with a higher security level, the user must be re-authenticated and/or re-authorized before access is granted to the security domain with the higher security level.

Figure 2:
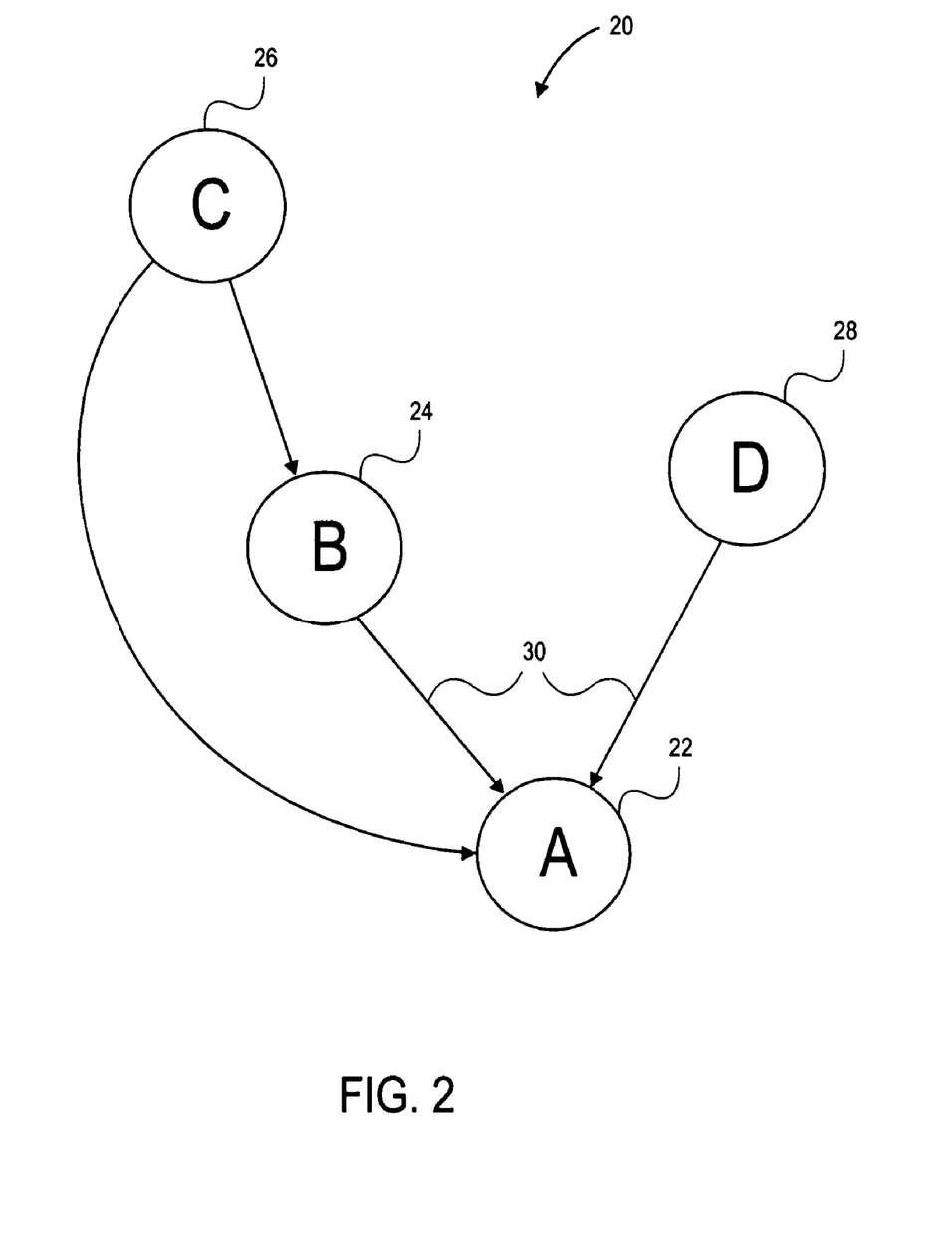
FIG. 2 is a schematic representation of a hierarchy of security domains according to an embodiment of the invention.

FIG. 2 illustrates a hierarchy 20 of security domains, according to an embodiment of the invention. The hierarchy 20 of security domains includes security domain A 22, security domain B 24, security domain C 26, and security domain D 28. As indicated by arrows 30, which point in a direction from a "higher" security level to a "lower" security level, security domain A 22 is "connected," on in relationship, with security domain B 24, security domain C 26, and security domain D 28. Security domains B 24, C 26, and D 28, all have a higher security level than security policy A 22.

Security domain B 24 has a "mid," or moderate, security level as it is higher in the hierarchy 10 than security domain A 22 and lower in the hierarchy 10 than security domain C 26. Nevertheless, security domain B 24 is in a relationship with both security domain A 22 and security domain C 26. It should be noted, that in the embodiment illustrated, there is no relationship between security domain B 24 and security domain D 28.

Security domain C 26 has a "high" security level as no arrow 30 points to security domain C 26 because there is no security domain, in the illustrated by FIG. 2, with a higher security level than security domain C 26. It should be noted that, in the embodiment illustrated, there is no relationship between security domain C 26 and security domain D 28.

Security domain D 28 has either a mid or a high security level as it is above security domain A 22 but there is no relationship defined between security domain D 28 and security domain B 24 or security domain C 26.

Figure 3A:
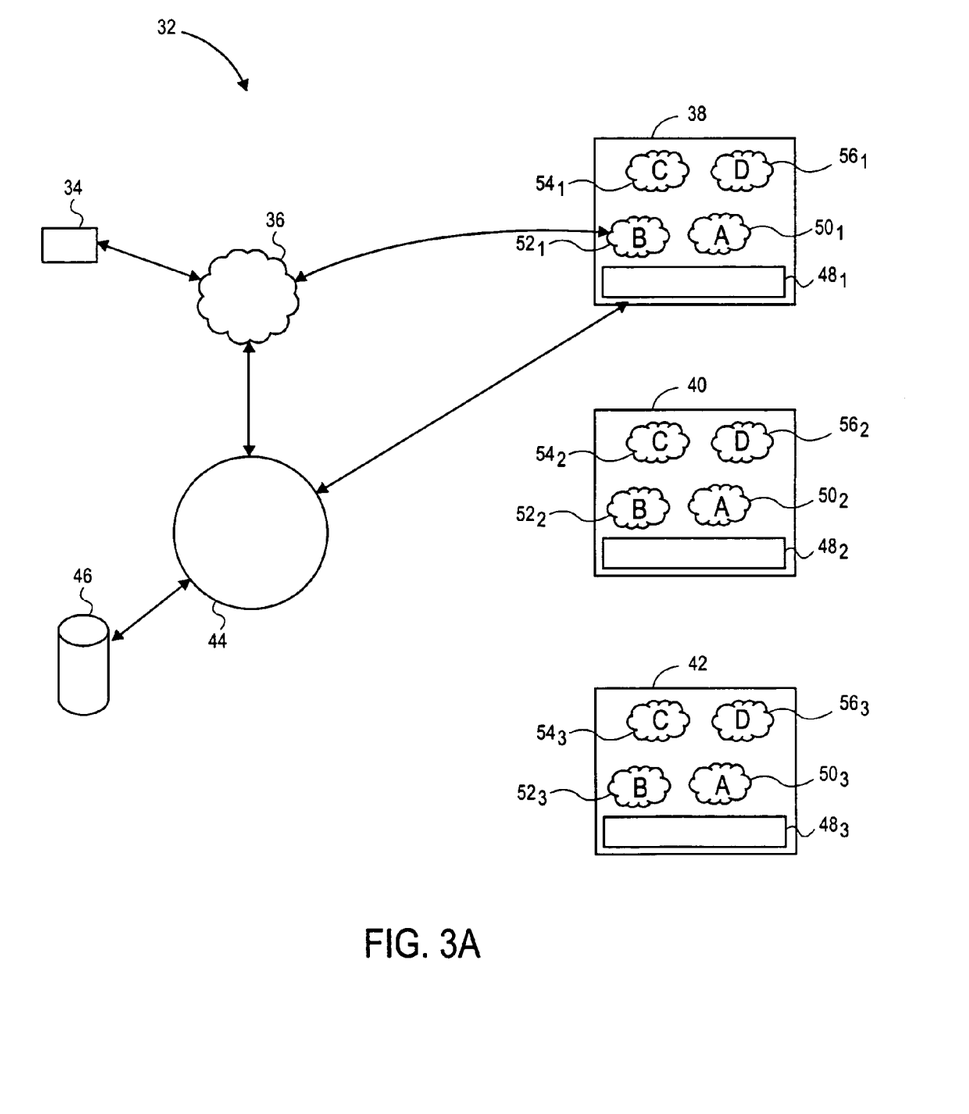

FIGS. 3A-5C illustrate a networked computing system infrastructure 32 operated in accordance with the hierarchy 20 of security domains illustrated in FIG. 2. Referring specifically to FIG. 3A, the networked computing system infrastructure 32 includes a client 34, a network 36, a first container 38, a second container 40, a third container 42, a security manager 44, and a database 46.

The client 34 is, for example, a computer or a person using a computer, attempting to gain access to the first 38, second 40, and/or third 42 containers through the network 36. The network 36 is, for example, the internet or a private network (or combination thereof) which is accessed by the client 34 through the internet.

The containers 38, 40, and 42 are collections of software modules (such as applications and/or data) installed on a computing system and made accessible through the network 36. Examples of containers include web containers, EJB containers, SAML containers, or other servers. In the embodiment illustrated in FIG. 3A, each of containers 38, 40, and 42 contains four applications $50_{1-3}$, $52_{1-3}$, $54_{1-3}$, and $56_{1-3}$, each of which incorporates at least one software module from each of the security domains A, B, C, or D. Each container 38, 40, and 42 also contains a security policer $48_{-1}$, $48_2$, and $48_3$, which "understands" or is programmed to recognize the hierarchy 20 of security domains as illustrated in FIG. 2.

The security manager 44 is connected to the database 46. The database 46 includes a list of users and/or a list of identifiers (e.g., principles) for each of the users and the security domains into which each of them is authorized to be granted access.

Figure 3B:
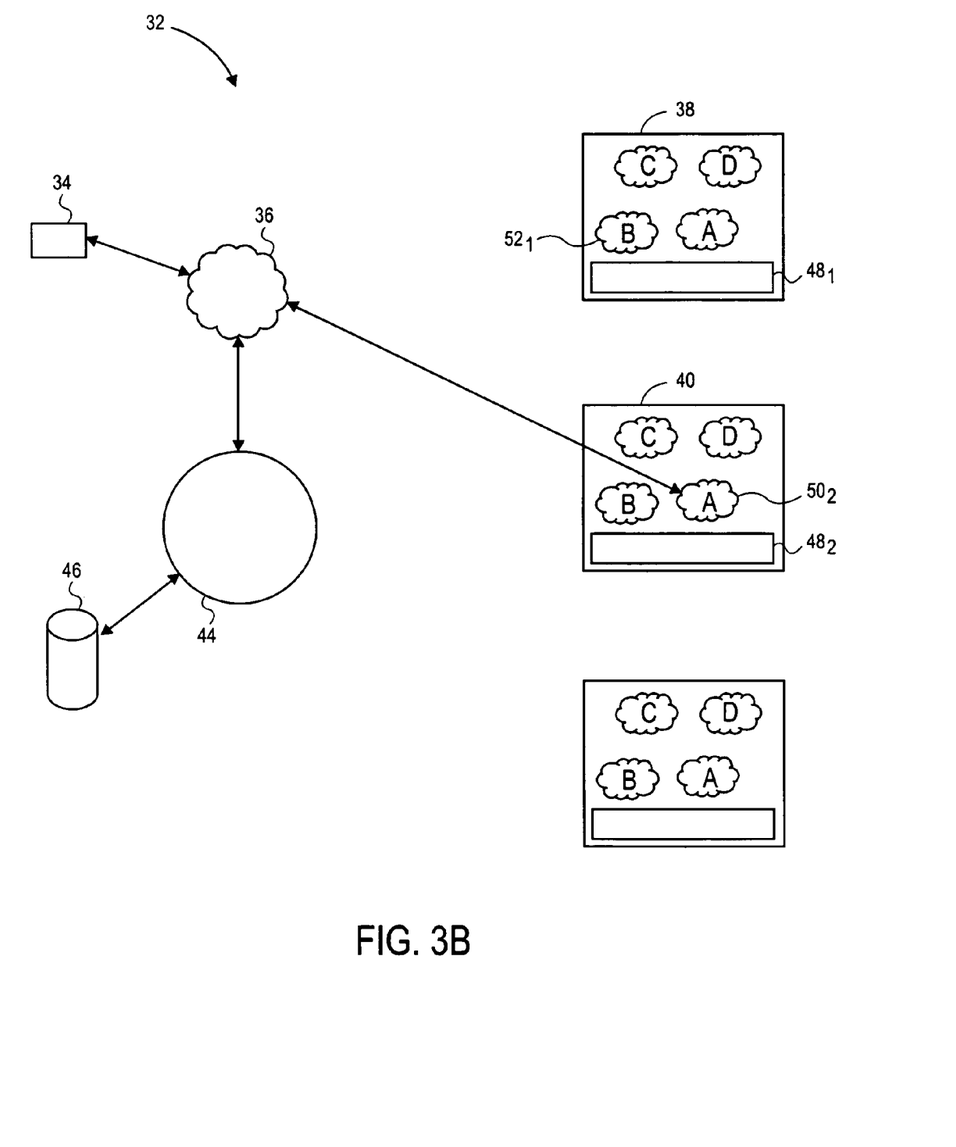

In use, as illustrated in FIGS. 3A and 3B, the client 34 attempts to access one of the containers by, for example, initiating an Hypertext Transfer Protocol (HTTP) session, as is commonly understood in the art, through the network 36. A session is a series of interactions between communication end points that during the span of a connection through the network 36.

In the example illustrated, the client 34 attempts to access application $52_1$ within the first container 38. The security policer $48_1$ in the first container 38 recognizes that the client 34 is attempting to access application $52_1$ which is protected by security domain B, communicates with the security manager 44 that an attempt is being made to access security domain B without prior authentication and/or authorization, and appropriately identifies the client 34 and/or the client's 34 HTTP session to the security manager 44.

The security manager 44 prompts the client 34, either directly or through the network 36 as illustrated in FIG. 3A, with an authentication message such as a request for identification by, for example, requesting a user ID and a password. The client's 34 response is then sent to the security manager 44 from the network 36. When the security manager 44 receives the authentication information, in whatever form it may be, the security manager 44 accesses the database 46.

The security manager 44 then checks the database 46 for the permitted security domains for the received authentication information. In this example, if the client 34 is authorized for access to security domain B, the security manager 44 will communicate back to the security policer 48 within the first container 38 that permission is granted for the client 34 to access application 52.

The security policer 48 then "tags," or identifies, the client's HTTP session as having been authenticated and/or authorized for access to an application with security domain B.

Referring specifically to FIG. 3B, the client 34 then attempts to access a different application within a different container. In the example illustrated, after the client 34 has accessed application $52_1$, having security domain B, in the first container 38, the client attempts to access application $50_2$, having security domain A, within the second container 40. The security policer $48_2$ in the second container 30 recognizes that a client associated with an HTTP session tagged as being "cleared" for security domain B is attempting to access application $50_2$ with security domain A. That is, the security policer $48_2$ recognizes that a client logged in through an HTTP session that has already been tagged as a session authorized for security policy B, which has a "higher" security level than security policy A as illustrated FIG. 2, is attempting to access an application at security level A.

Referring again to FIG. 3B, because the client's session has already been authorized for security domain B, and security domain B has a higher security level than security domain A, within the hierarchy of security domains, the client 34 is allowed, by the security policer $48_2$, to access application $50_2$ without requesting re-authentication from the security manager 44.

Figure 4A:
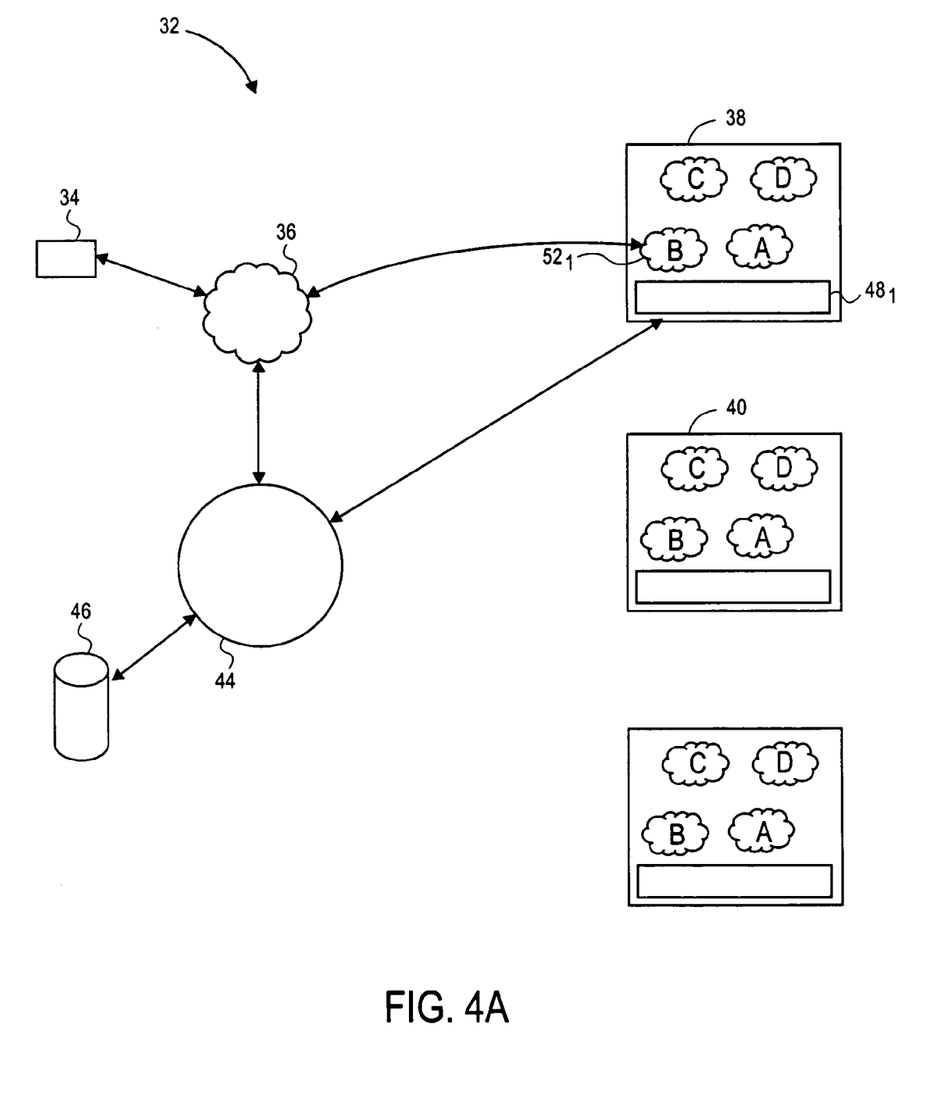
Figure 4B:
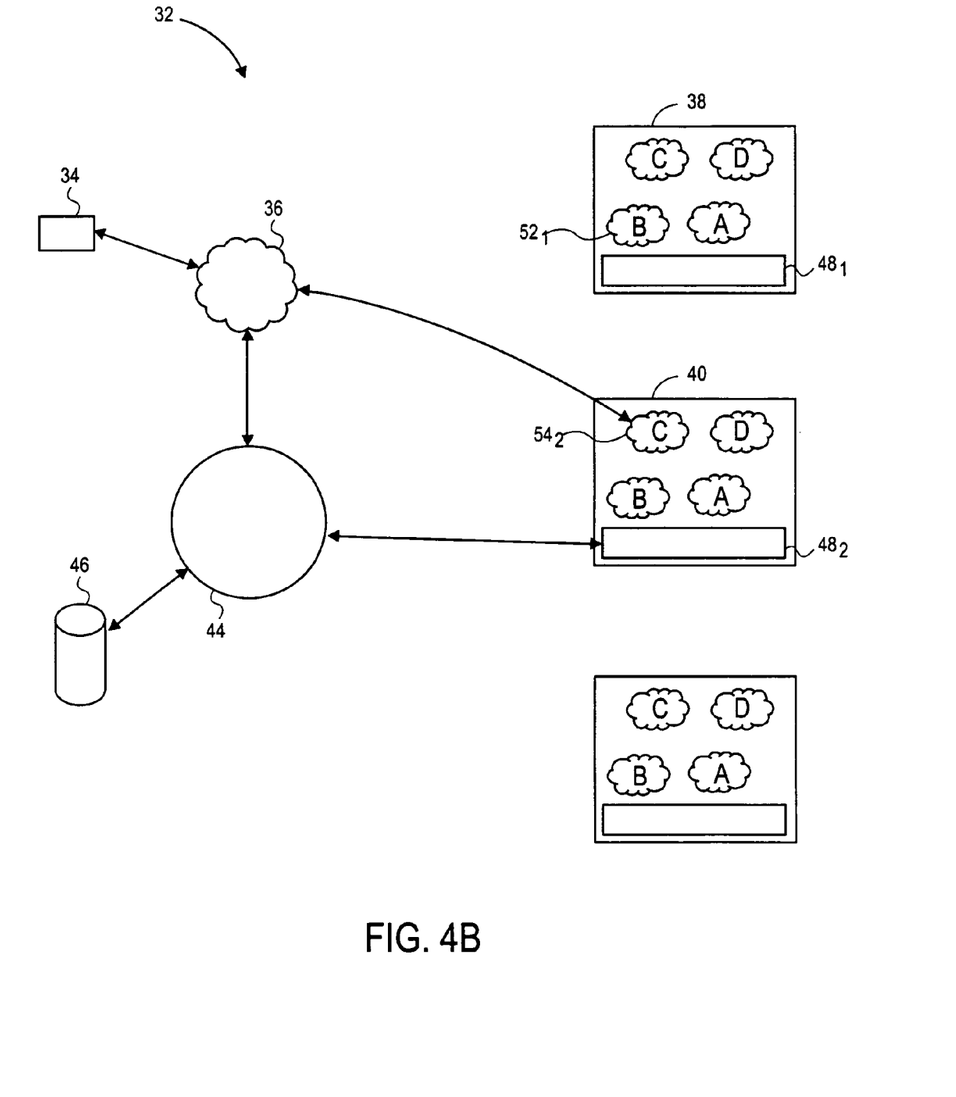

FIGS. 4A and 4B illustrate another attempt by the client to access one of the containers. Similarly to FIG. 3A, FIG. 4A illustrates the client 34 being initially authenticated and authorized for access to application $52_1$, having security domain B, within the first container 28. Here again, the client's session will be tagged as having clearance to security domain B. However, as illustrated in FIG. 4B, the client 34 next attempts to access application $54_2$, having security domain C, within the second container 40. The security policer $48_2$ in the second container 40 recognizes that the client 34 is attempting to access application $54_2$ and that application $54_2$ has security domain C. The security policer $48_2$ also recognizes that the client 24, or specifically the client's HTTP session, has only been tagged for access to security domain B.

Referring back to FIG. 2, security domain B 24 has a lower security level than security domain C 26.

Thus, the security policer $48_2$ re-requests authentication and authorization from the security manager 44 for the client 34. As previously discussed, the security manager 44 requests authentication information from the client 34. Upon receiving the authentication information from the client 34, the security manager 44 then checks the database 46 for the permitted security domains for the received authentication information. In this example, if the client 34 is authorized for access to security domain C, the security manager 44 will communicate back to the security policer $48_2$ in the second container 40 that the client 34 is authorized to access application $54_2$. The client's session is then re-tagged as having been cleared for security domain C.

Figure 5A:
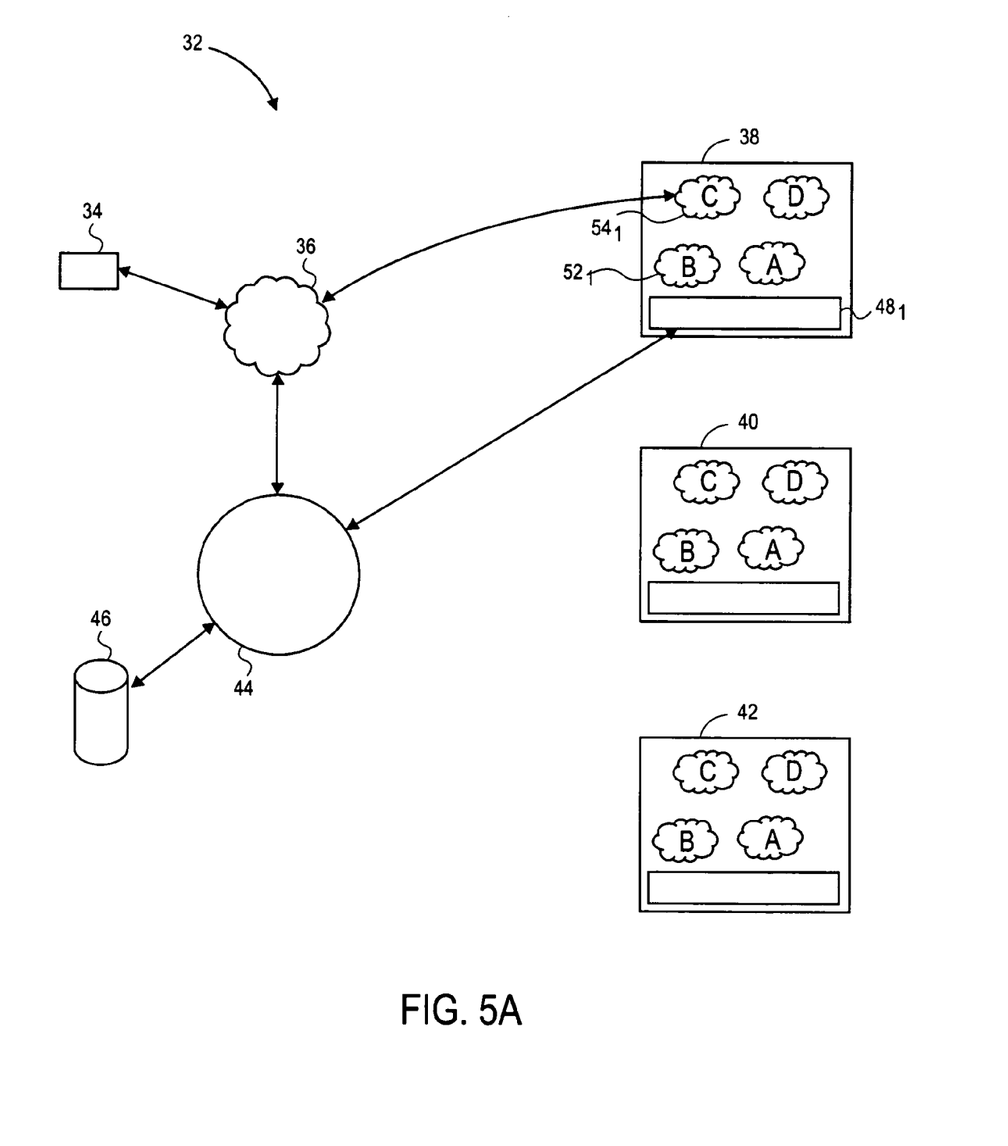
Figure 5B:
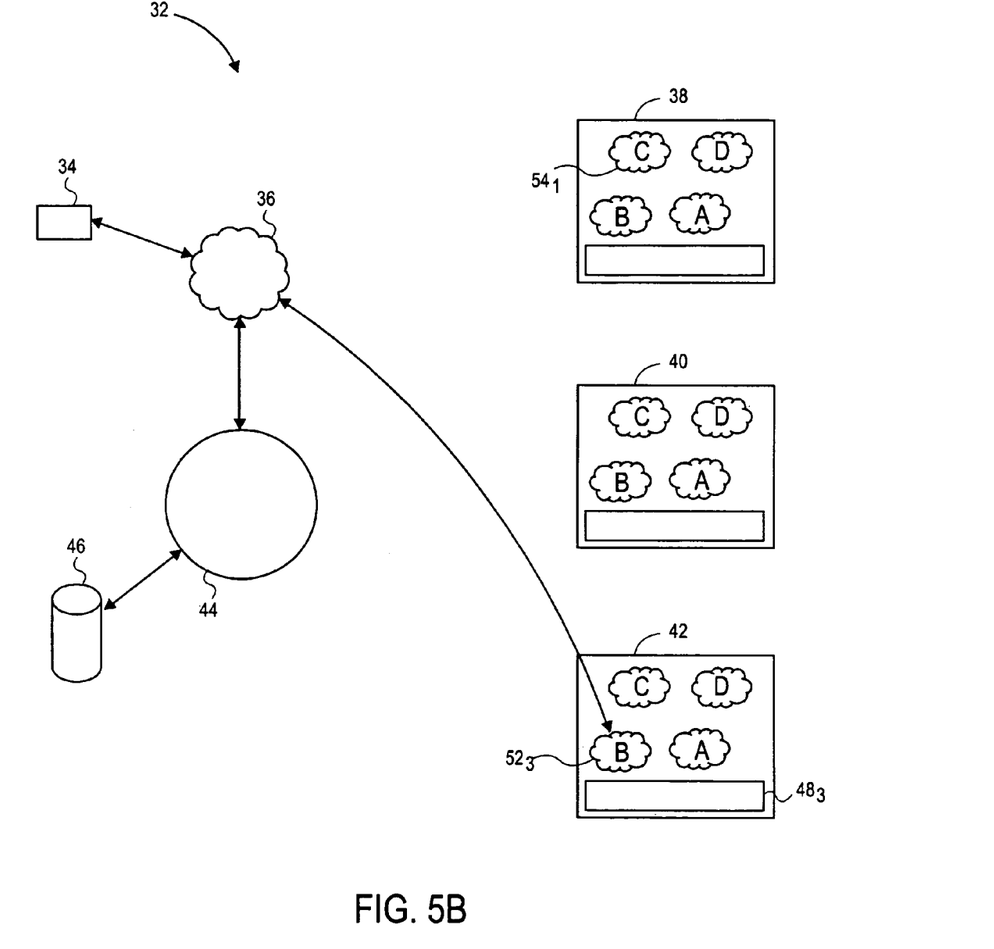
Figure 5C:
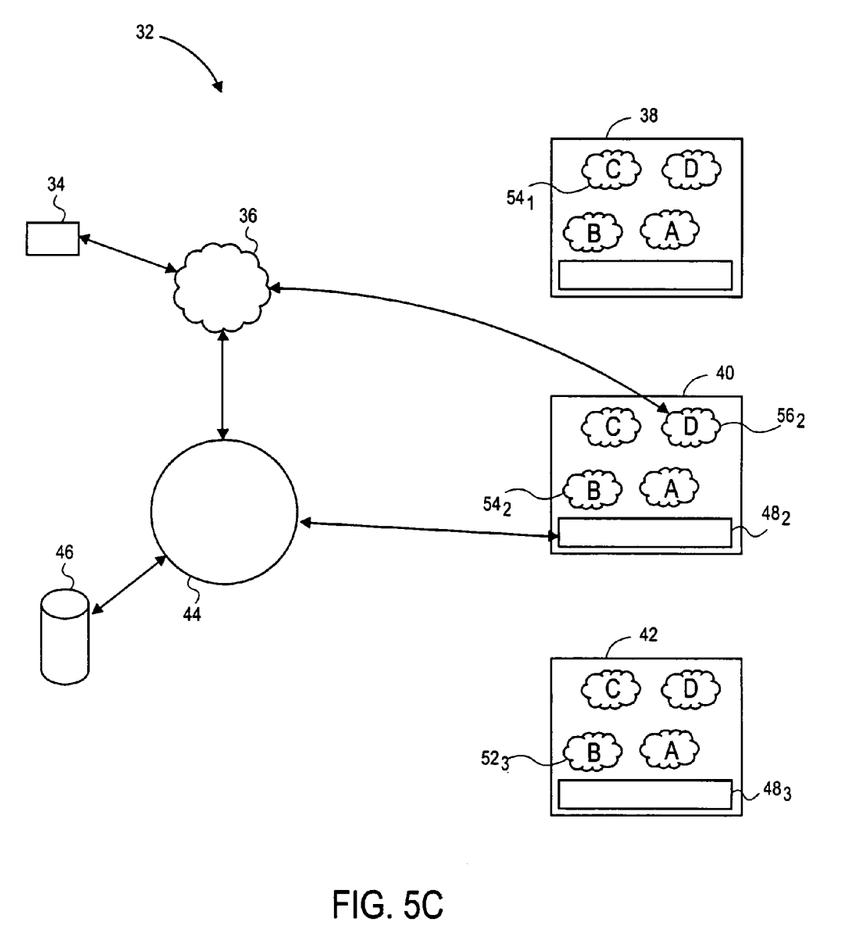

FIGS. 5A-5C illustrate another attempt by the client to access the applications within the containers. Referring specifically to FIG. 5A, the client 34 initially attempts to access application $54_1$, having security domain C, within the first container 38 in the manner described in FIGS. 3A and 4A. Again, once the client 34, or http session, gains access to security policy C, the security policer $48_1$ tags the client 34, or the client's HTTP session, as having been authorized to access security policy C.

As illustrated in FIG. 5B, the client 34 then attempts to access application $52_3$, having security domain B, within the third container 42. As previously discussed, because the FTTP session has already been tagged by a security policer 48 as having been authorized for access to a security domain which has a higher security level than B, the client 34 will be allowed to access application $52_3$ without having to pass a re-authentication/re-authorization process. The security policer 48 in the third container 42 does not retag the http session as having been granted access to security policy B because the session has already been tagged as having been authorized to access security policy C, which has a higher security level than security policy B.

As illustrated in FIG. 5C, the client 34 then attempts to access application $56_2$, having security policy D, within the second container 40. The security policer $48_2$ in the second container 40 recognizes that the client 34 is attempting to gain access to application $46_2$, which has security domain D, and that the client's HTTP session has been tagged for access to security domain C.

Referring back to FIG. 2, there is no relationship, or connection, between security domain C 26 and security domain D 28. Therefore, referring again to FIG. 5C, the security policer $48_2$ in the second container 40 requests the security manager 44 to re-authenticate and authorize the client 34 for access into security domain D in the manner already discussed.

It should be noted that if the client were to attempt to access a application with the same security domain as the application the client is currently accessing, the client would of course be granted access to that application without having to re-authenticate. Therefore, if in FIG. 5C the client was attempting to access application $52_2$ within the second container 40, the client would be allowed access without having to re-authenticate.

Figure 6:
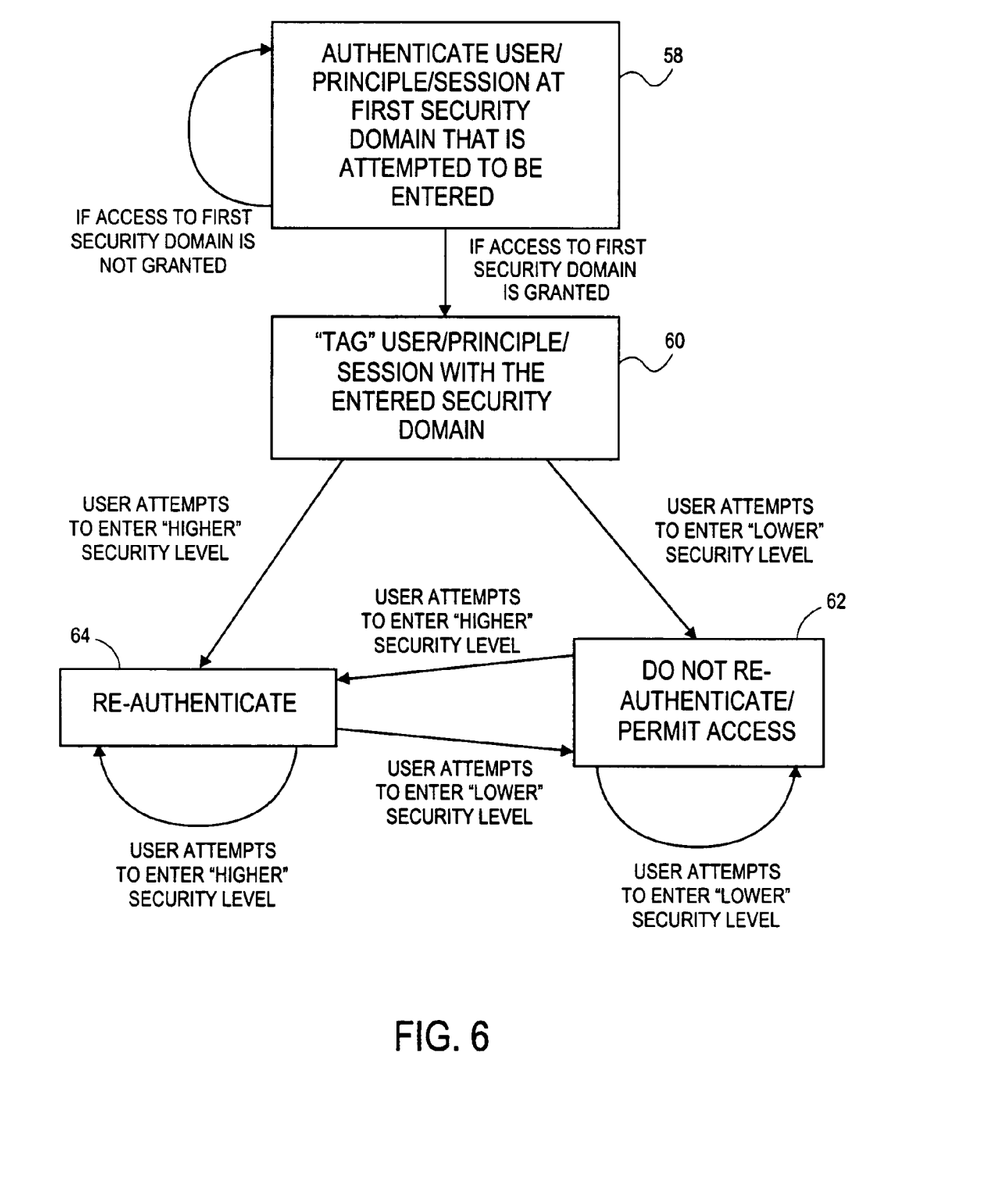
FIG. 6 is a flow chart illustrating a method for authenticating and authorizing a user in accordance with a present invention.

FIG. 6 illustrates a method of authenticating and authorizing a user access to a system, in accordance with the principles of the present invention and the embodiment illustrated in FIGS. 3A-5C. First, at methodology 58, a user/principle/session is authenticated at a first security policy that a user attempts to enter. Next, at methodology 60, if the user is authorized for access to the first security domain, a session (e.g., HTTP session) is "tagged" with the accessed security domain. If the user is not authorized for access to the first security domain, the user is not granted access (note that each subsequent attempt to gain access prior to any access being given can be deemed as a "first" access).

The user may then attempt to either enter a lower security level or a higher security level. At methodolgy 62, if the user attempts to enter a lower security level, the user is not required to re-authenticate to be permitted access to the lower security level. If the user then attempts to enter another even lower security level, re-authentication is not required for access. The user will not be required to re-authenticate so long as the user attempts to access lower security levels.

From either methodology 60 or methodology 62, if the user attempts to enter a higher security level, the user is required to re-authenticate. Note that a centralized authorization service as observed in FIGS. 3A-5C may be used. If the user then again attempts to enter an even higher security, the user must again re-authenticate. The user will be required to re-authenticate every time the user attempts to enter a security level that is higher than the highest security level for which the user was previously authenticated, authorized, and/or tagged. With each successful access into a higher level, the session is re-tagged as having been cleared for the higher level.

Although the embodiment illustrated in FIGS. 3A-5C has three containers, it should be understood that the method of FIG. 6 may be practiced and used within a single container. The containers may be implemented on a single computing system or multiple computing systems (e.g., one installed container per computing system).

From methodology 64, the user may attempt to enter a lower security level, and again as illustrated by methodology 62, re-authentication will not be required for the user to do so.

Figure 7:
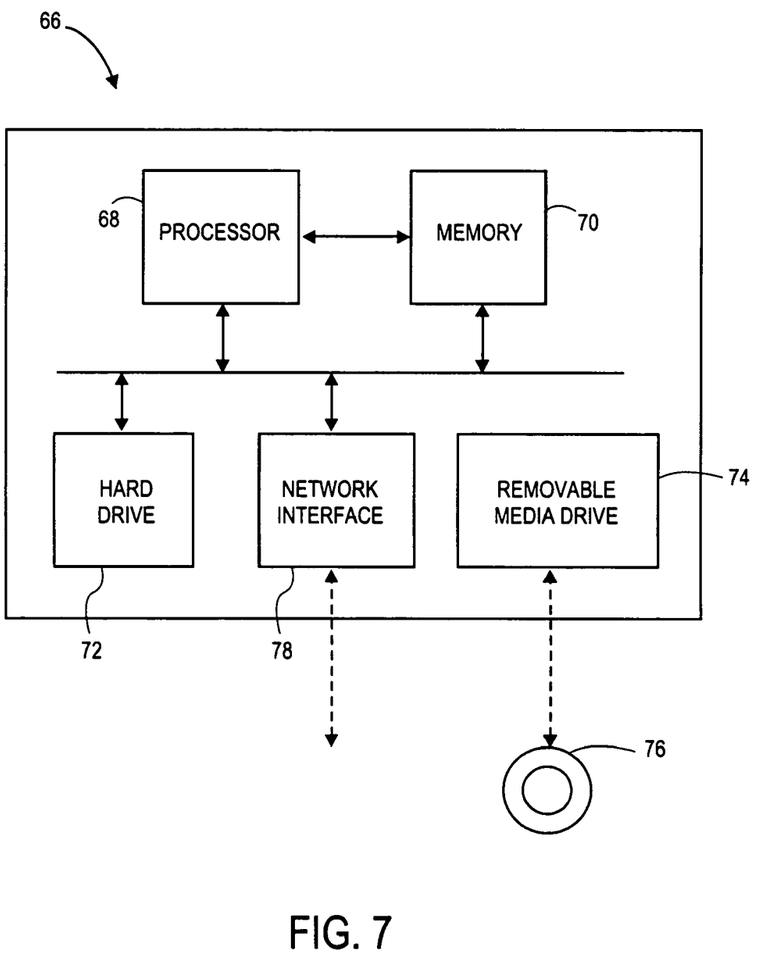
FIG. 7 is a block diagram of a computing system.

FIG. 7 is a block diagram of a computing system 66 that can execute program code stored by an article of manufacture. The computing system 66 includes a processor 68, a memory 70, a hard drive 72, a network interface 78, a removeable media drive 74, and a CD-ROM 76. It is important to recognize that the computing system of FIG. 7 is just one of various computing architectures. The applicable article of manufacture may include one or more fixed components (such as a hard disk and a memory) and/or movable components such as a CD-ROM, a compact disc, a magnetic tape, etc. In order to execute program code, typically instructions of the program code are loaded into the memory 70, such as Random Access Memory (RAM), and the processor 68, or microprocessor, then executes the instructions.

The computing system of FIG. 7 may be incorporated at various places within the networked computing system infrastructure 32 of FIGS. 3A-5C and may be used to execute instructions in the form of software that may include the hierarchy of security domains and the described method for authenticating/authorizing a user for access to various types of information.

The processes taught by the discussion above can be practiced within various software environments such as, for example, object-oriented and non-object-oriented programming environments, Java based environments (such as a Java 2 Enterprise Edition (J2EE) environment or environments defined by other releases of the Java standard, or other environments (e.g., a .NET environment, a Windows/NT environment, each of which is provided by Microsoft Corporation).

Processes taught by the discussion above may be performed with program code such as machine-executable instructions which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A method comprising:
   requesting authentication of a user attempting to access a first resource through a session, the first resource being within a first security domain, the first security domain being within a hierarchy of security domains, the hierarchy defining related and unrelated security domains and a relative security level of one or more related security domains;
   identifying the session as having access to the first security domain;
   granting the user access to a second resource without requesting authentication of the user for access to a second security domain based on said identification, the second resource being within the second security domain, the second security domain related to the first security domain and having a lower relative security level than the first security domain within the hierarchy of security domains; and
   not granting the user access to the second resource without requesting authentication of the user for access to the second security domain if the second security domain:
   is unrelated to the first security domain, or
   is related to the first security domain but has a higher relative security level than first security domain within the hierarchy of security domains.

2. The method of claim 1, wherein the session is a HTTP session.

3. The method of claim 2, wherein the authentication if performed comprises requesting and receiving authentication information from the user.

4. The method of claim 3, wherein the first resource is stored in a first container and the second resource is stored in a second container.

5. The method of claim 4, wherein the first container is in a first computer system and the second container is in a second computer system.

6. The method of claim 5, wherein the HTTP session is redirected between the first computer system to the second computer system when the user attempts to access the second resource.

7. The method of claim 6, the first and second computer systems recognize the hierarchy of security domains.

8. The method of claim 7, wherein said requesting and receiving authentication information from the user is performed by a centralized security manager being shared by both the first and second computer systems.

9. The method of claim 8, wherein the security manager retrieves authorization information from a database based on the received authentication information.

10. An article of manufacture including program code stored on a machine-readable medium which, when executed by a machine, causes the machine to perform a method, the method comprising:
    authenticating a user attempting to access a first resource through a session, the first resource being within a first security domain and stored on a computing system, the first security domain being within a hierarchy of security domains, the hierarchy defining related and unrelated security domains and a relative security level of one or more related security domains;
    identifying the session as having access to the first security domain;
    granting the user access to a second resource without authenticating the user for access to the second security domain based on said identification, the second resource being within a second security domain and stored on the computing system, if the second security domain is related to the first security domain and has a lower relative security level than the first security domain within the hierarchy of security domains; and
    not granting the user access to the second resource without authenticating the user for access to the second security domain based on said identification, if the second security domain:
    is unrelated to the first security domain, or
    is related to the first security domain but has a higher relative security level than first security domain within the hierarchy of security domains.

11. The article of manufacture of claim 10, wherein the session is a HTTP session.

12. The article of manufacture of claim 11, wherein the authenticating comprises requesting and receiving authentication information from the user.

13. The article of manufacture of claim 12, wherein the first resource is stored in a first container and the second resource is stored in a second container.

14. The article of manufacture of claim 13, wherein the first container is in a first computer system and the second container is in a second computer system.

15. The article of manufacture of claim 14, wherein the HTTP session jumps between the first computer system and the second computer system when the user attempts to access the second resource.

16. The article of manufacture of claim 15, wherein the first and second computer systems recognize the hierarchy of security domains.

17. The article of manufacture of claim 16, wherein said requesting and receiving authentication information from the user is performed by a centralized security manager being shared by both the first and second computer systems.

18. The article of manufacture of claim 17, wherein the security manager retrieves authorization information from a database based on the received authentication information.

19. A computing system comprising:
    a collection of resources accessible to clients via a network, a resource in the collection of resources belonging to a security domain;
    a database having authorization information for determining a user to whom access to a security domain may be granted;
    a processor having a security enforcement logic protecting the collection of resources, the security enforcement logic programmed to recognize a hierarchy of security domains, the hierarchy including the security domain to which the resource belongs, the hierarchy defining related and unrelated security domains and a relative security level of one or more related security domains, wherein the security enforcement logic uses authorization information from the database to authenticate a user attempting to access a first resource through a session, the first resource belonging to a first security domain within the hierarchy of security domains, the security enforcement logic further:

identifying the session as having access to the first security domain based at least in part on the authentication of the user attempting to access the first resource, granting the user access to a second resource belonging to a second security domain without authenticating the user for access to the second security domain based on said identification if the second security domain is related to the first security domain and has a lower relative security level than the first security domain within the hierarchy of security domains, and not granting the user access to the second resource without authenticating the user for access to the second security domain based on said identification if the second security domain:

is unrelated to the first security domain, or is related to the first security domain but has a higher relative security level than first security domain within the hierarchy of security domains.

20. The computing system of claim 19, wherein the session is a HTTP session.

21. The computing system of claim 20, wherein to authenticate the user attempting to access the first resource through the session, the security enforcement logic further obtains authentication information from the user.

22. The computing system of claim 21, wherein the first resource is stored in a first container and the second resource is stored in a second container.

23. The computing system of claim 22, wherein the first container is in a first computer system and the second container is in a second computer system.

24. The computing system of claim 23, wherein the HTTP session jumps between the first computer system and the second computer system when the user attempts to access the second resource.

25. The computing system of claim 24, wherein the security enforcement logic of the first and second computer systems are each programmed to recognize the hierarchy of security domains.

26. The computing system of claim 25, wherein to authenticate the user attempting to access the first resource through the session, a centralized security manager being shared by both the first and second computer systems obtains the authentication information from the user.

27. The computing system of claim 26, wherein to authenticate the user attempting to access the first resource through the session, the centralized security manager further retrieves the authorization information from the database based on the authentication information obtained from the user.

28. A method comprising:

authenticating a user for access to a first security domain, the first security domain being within a hierarchy of security domains, the hierarchy defining related and unrelated security domains and a relative security level of one or more related security domains;

granting the user access to a second security domain without authenticating the user for access to the second security domain if the second security domain is within the hierarchy of security domains, is related to the first security domain, and has a lower relative security level than the first security domain;

identifying the user as having been authenticated for access to the first security domain; and not granting access to the second security domain without authenticating the user for access to the second security domain if the second security domain:

is not within the hierarchy of security domains, or is within the hierarchy of security domains but is unrelated to the first security domain, or is within the hierarchy of security domains and related to the first security domain but has a higher relative security level than the first security domain.

* * * * *